(No Model.) 2 Sheets—Sheet 1.
E. H. WARNER.
FOOD STEAMER.
No. 442,264. Patented Dec. 9, 1890.
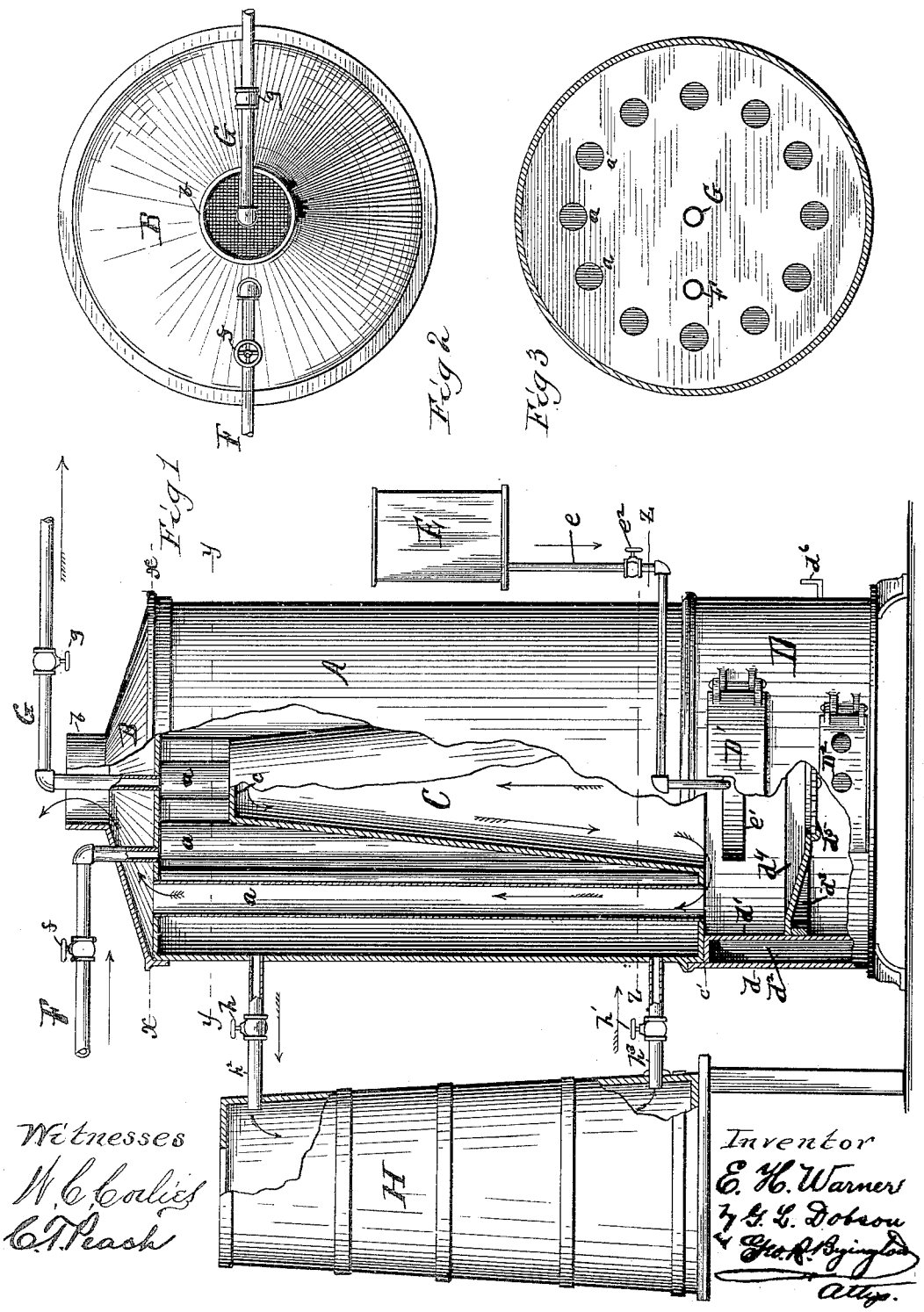
Witnesses
W. C. Colies
C. T. Peach
Inventor
E. H. Warner
by G. L. Dobson
& Geo. R. Byington
Attys.

(No Model.) 2 Sheets—Sheet 2.

E. H. WARNER.
FOOD STEAMER.

No. 442,264. Patented Dec. 9, 1890.

Witnesses
W. C. Corliss
C. F. Peach

Inventor
E. H. Warner
by G. L. Dobson
and Geo. A. Byington
attys

UNITED STATES PATENT OFFICE.

EFFINGHAM H. WARNER, OF STORM LAKE, IOWA.

FOOD-STEAMER.

SPECIFICATION forming part of Letters Patent No. 442,264, dated December 9, 1890.

Application filed July 3, 1890. Serial No. 357,684. (No model.)

*To all whom it may concern:*

Be it known that I, EFFINGHAM H. WARNER, a citizen of the United States, residing at Storm Lake, in the county of Buena Vista and State of Iowa, have invented certain new and useful Improvements in Food-Steamers; and I do hereby declare the following to be a full, clear, and exact description of the invention, such as will enable others skilled in the art to which it appertains to make and use the same.

My invention relates to food-steamers.

The object of my invention is to construct a steamer for cooking food for farm stock and for heating water; and to this end the nature of my invention consists of constructions and combinations, all as will be hereinafter described in the specification, and particularly pointed out in the claims, reference being had to the accompanying drawings, in which—

Figure 4:
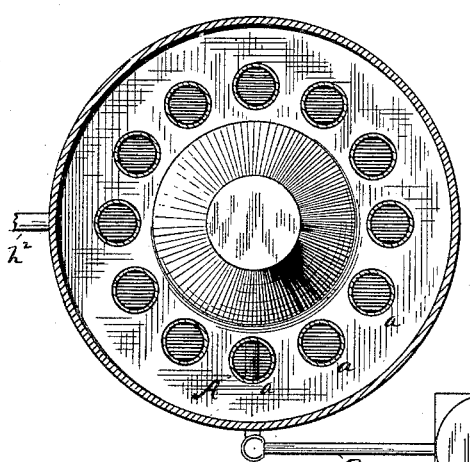
Figure 5:
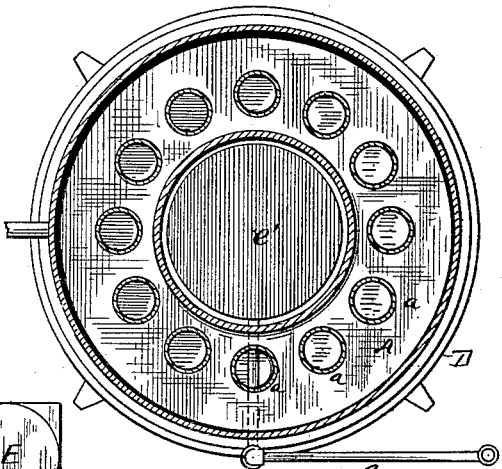
Figure 6:
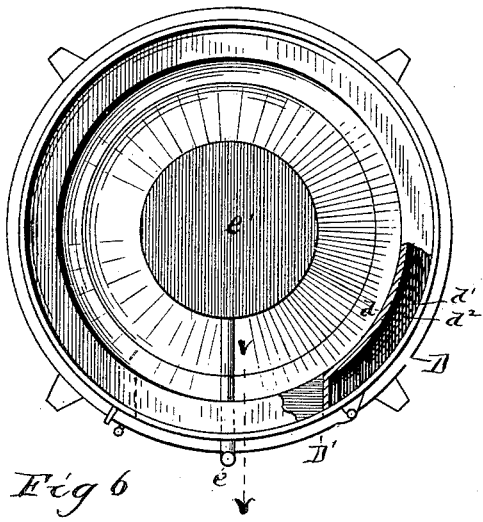
Figure 7:
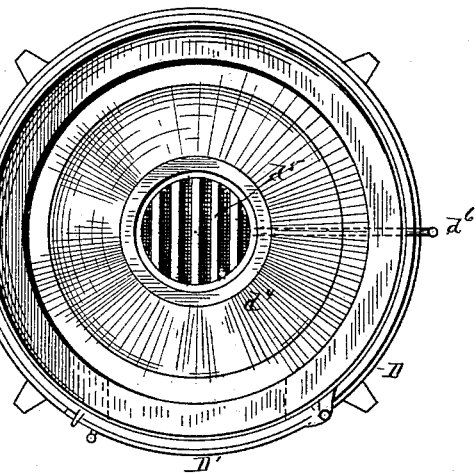
Figure 8:
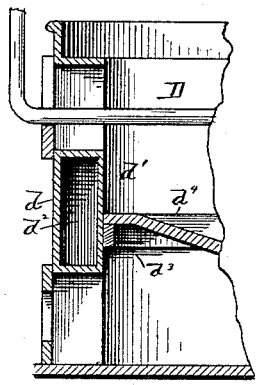

Figure 1 is a side elevation of my improved steamer and water-heater, a part being broken away; Fig. 2, a top plan view of the boiler portion; Fig. 3, a detail plan section on line $x\ x$, Fig. 1; Fig. 4, a plan section of the boiler portion on line $y\ y$, Fig. 1; Fig. 5, a similar plan section on the line $z\ z$, Fig. 1; Fig. 6, a detail plan view of the base portion of the steamer, a part being broken away; Fig. 7, a plan view of the base portion with the generator removed, showing the fire-grate for using coal; and Fig. 8 a detail cross-section of the base portion on line V V, Fig. 6.

A represents the boiler, which is cylindrical in form and provided with a top B, having the usual smoke-stack $b$, through which the smoke and heat ascend. In the center of the boiler A a cone-shaped combustion-chamber C is formed, which projects upwardly nearly to the crown of the boiler, so that as the heat and flame from the fire-box ascend they will completely fill the combustion-chamber and thus supply additional heating-surface to the boiler. As the products of combustion ascend the combustion-chamber C they strike against the apex $c$ of said combustion-chamber and are deflected downward, as indicated by the arrow, Fig. 1, and ascend the flues $a$ with which the boiler A is provided, and out of the smoke-stack $b$ to the air.

The base or heater D is provided with a flanged rim $c'$, formed by an outer and inner casing $d\ d'$, to receive the boiler. The outer and inner casing $d\ d'$ form a dead-air space $d^2$, so that the heat will be retained within the base D. Secured to the inner casing $d'$ is a ledge $d^3$, upon which is supported a shelf $d^4$, in which the grate $d^5$, having the usual shaker $d^6$, is secured when wood or coal is used as fuel.

The base or heater D is provided with doors D' D², the door D' leading into the fire-box, and the door D² leading to the ash-pit.

F is a supply-pipe leading to the boiler, by which the boiler is supplied with water, and the water-supply is controlled by the valve $f$.

G is the steam-pipe, which is inserted in the crown of the boiler and leads to the receptacle containing the food to be cooked, and it is provided with a valve $g$ to regulate the steam-supply.

When it is desired to keep the water-supply for cattle contained in the tank H from freezing, the valves $f$ and $g$ on the water-supply and steam-pipes F and G are closed, and the valves $h\ h'$ on the pipes $h^2\ h^3$ are opened, which allows the hot water or steam to circulate through the tank H, as indicated by arrows, Fig. 1, and thus prevent the water from freezing.

What I claim is—

1. In a food-steamer, the combination of a boiler having a cone-shaped combustion-chamber closed at its upper end secured within said boiler, a base or heater having an outer and inner casing, forming a dead-air space, and flanged rim for the boiler, and fire-tubes located between the inner edge of the dead-air chamber and said combustion-chamber, substantially as shown and described.

2. In a food-steamer, the combination of a base or heater having an outer and inner casing, forming a dead-air space, and a flanged rim, a ledge secured to the inner casing and supporting a grate-shelf, a grate on said shelf, and a boiler secured on said flanged rim and having a cone-shaped combustion-chamber closed at its upper end secured within said boiler, and fire-tubes located between the inner edge of the dead-air chamber and said combustion-chamber, substantially as shown and described.

In testimony whereof I affix my signature in presence of two witnesses.

EFFINGHAM H. WARNER.

Witnesses:
R. H. BROWN,
ZEPH. CHAS. FELT.